United States Patent
Foerster (10) Patent No.: US 11,298,212 B2
(45) Date of Patent: Apr. 12, 2022

(54) SET OF BRACKETS FOR ORTHODONTICS

(75) Inventor: Rolf Foerster, Pforzheim (DE)

(73) Assignee: BERNHARD FOERSTER GMBH, Pforzheim (DE)

(*) Notice: Subject to any disclaimer, the term of this patent is extended or adjusted under 35 U.S.C. 154(b) by 393 days.

(21) Appl. No.: 13/378,633

(22) PCT Filed: Jun. 11, 2010

(86) PCT No.: PCT/EP2010/003519
§ 371 (c)(1),
(2), (4) Date: Jan. 30, 2012

(87) PCT Pub. No.: WO2010/145782
PCT Pub. Date: Dec. 23, 2010

(65) Prior Publication Data
US 2012/0129120 A1 May 24, 2012

(30) Foreign Application Priority Data
Jun. 17, 2009 (DE) ............... 10 2009 029 834.7

(51) Int. Cl.
*A61C 7/28* (2006.01)

(52) U.S. Cl.
CPC .................... *A61C 7/287* (2013.01)

(58) Field of Classification Search
CPC ........... A61C 7/141; A61C 7/28; A61C 7/287; A61C 7/22
USPC ...................................... 433/8–11
See application file for complete search history.

(56) References Cited

U.S. PATENT DOCUMENTS

| | | | |
|---|---|---|---|
| 4,249,897 A * | 2/1981 | Anderson | 433/8 |
| 5,248,257 A | 9/1993 | Cannon | |
| 5,350,059 A * | 9/1994 | Chester et al. | 206/63.5 |
| 5,820,370 A * | 10/1998 | Allesee et al. | 433/8 |
| 5,906,486 A | 5/1999 | Hanson | |
| 7,717,706 B2 | 5/2010 | Foerster | |
| 2004/0072118 A1 | 4/2004 | Heiser et al. | |
| 2006/0199137 A1* | 9/2006 | Abels | A61C 7/12 433/11 |
| 2007/0269763 A1 | 11/2007 | Schendell-Groling | |
| 2007/0281269 A1* | 12/2007 | Forster | 433/11 |
| 2009/0061376 A1* | 3/2009 | Wool | 433/11 |

* cited by examiner

*Primary Examiner* — Ralph A Lewis
(74) *Attorney, Agent, or Firm* — Hackler Daghighian Martino & Novak (57) ABSTRACT

A set of self-ligating brackets for orthodontics includes brackets having a base and a block arranged on the base. An occlusal wall extends from the block and has at least one occlusal ligature wing. A gingival wall extends from the block and has at least one gingival ligature wing. A slot, which separates the occlusal wall and the gingival wall from one another, has the same minimum clear width for the brackets of the set and extends continuously in a direction from mesial to distal. The slot also has a base area on which an archwire lies during orthodontic treatment. A passage extends in the gingival-occlusal direction through the block and is delimited by a lingually located surface and by a labially located surface. Resilient clips with a labial leg and with a lingual leg are interconnected by an occlusally arranged portion.

17 Claims, 5 Drawing Sheets

SET OF BRACKETS FOR ORTHODONTICS

The invention refers to a set of brackets for orthodontics.

DE 10 2006 027 130 A1 discloses a set which comprises a bracket for orthodontics with a base, a block arranged on the base, an occlusal wall extending from the block and having at least one occlusal ligature wing, a gingival wall extending from the block and having at least one gingival ligature wing, a slot, which separates the occlusal wall and the gingival wall from one another, extends continuously in the direction from mesial to distal and has a base area on which an archwire lies during orthodontic treatment, and with a passage, which extends in the gingival-occlusal direction through the block and is delimited by a lingually located surface and by a labially located surface, as well as two different, interchangeable resilient clips with a labial leg and with a lingual leg, which are interconnected by an occlusally or gingivally arranged portion.

The lingual leg can be inserted into the passage and can be displaced therein only in the gingival-occlusal direction between a closed position, in which the labial leg extends into a recess in the gingival wall or in the occlusal wall, and an open position of the clip.

The recess in the gingival or in the occlusal wall has at least in labial direction a stop for the labial leg of the clip. Depending on the orientation of the clip in the bracket, the tip of the labial leg of the clip lies in the open position either above the occlusal wall or above the gingival wall of the bracket, so that an orthodontic archwire can be inserted into the slot in labial-lingual direction, in which slot the archwire is secured by the clip when said clip is in its closed position. The clip turns the bracket into a self-ligating bracket.

The set disclosed in DE 10 2006 027 130 A1 comprises different clips for one and the same bracket. Replacing a clip by a different clip allows to convert an active self-ligating bracket into a passive self-ligating bracket. By passive bracket is meant a bracket in which the archwires, which are inserted into the slot of the brackets for orthodontic treatment, cannot be subjected to pressure by the labial leg of the clip as long as the archwire lies on the base area of the slot. By active bracket is meant a bracket in which at least the archwires with the largest cross section occurring in orthodontic practice are subjected to pressure by the labial leg of the resilient clip even when they lie on the base area of the slot. This means that in such a case the clip can be moved into its closed position only by bending it elastically.

Passive brackets and active brackets both have their right to exist in the orthodontic treatment of malpositions of teeth. Active brackets are preferred for some malpositions or treatment phases for correcting malpositions, whereas passive brackets are preferred in other cases. More detailed information can be found in DE 10 2006 027 130 A1.

Clips for self-ligating brackets can be manufactured with reproducible resilient properties and dimensions only with difficulty as the brackets and the resilient clips have very small dimensions. This is also valid for self-ligating brackets of the kind disclosed in DE 10 2006 027 130 A1. There it is important to produce resilient clips for passive brackets with a slightly larger opening width than for active brackets. In addition, the resilient clips in the passive version of the bracket do not keep the slot closed as reliably as in the active version of the self-ligating brackets disclosed in document DE 10 2006 027 130 A1.

SUMMARY OF THE INVENTION

The object of the present invention is to provide a remedy for said shortcomings, without making the production of the self-ligating brackets more difficult.

This object is met by a set having the features specified in the independent claims. Advantageous refinements of the invention are the matter of dependent claims. The only difference between the embodiments taught herein is that the resilient clip in the case of one of the embodiments protrudes with its labial leg from the occlusal wall of the bracket into a recess in the gingival wall of the bracket. It is the other way round in the case of another embodiment; in such a case, the labial leg of the resilient clip protrudes from the gingival wall of the bracket into a recess of the occlusal wall of the bracket. The variation specified in the one of the embodiments is preferred because the clip can better withstand the stresses occurring when chewing and is kept more reliably in closed position than with the other embodiment.

The invention has significant advantages:

The resilient clip can be identical for all the brackets of a set and is preferably identical for all the brackets of a set. This is greatly simplyfies the production of the sensitive resilient clips.

To be able to produce active and passive brackets in spite of using resilient clips which are identical to one another, the invention suggests a bafflingly straightforward measure which consists in making only a single modification in the bracket, that is to say modifying the depth of the slot in the bracket in such a way that one obtains an active bracket of the set with a first depth of the slot and a passive bracket of the set with a second depth. The larger depth leads to a passive bracket, the smaller depth to an active bracket. With that exception, both brackets may be identical and preferably are identical.

The invention may for instance be realised by forming brackets whose slot has a small depth which in connection with a given clip leads to an active bracket. The depth of said slot can be deepened by milling off or grinding off a portion of the material from the base of the slot and thereby obtain a passive bracket.

The invention can however be realised in particularly cost efficient manner when the brackets are produced using an injection moulding process. This is not only possible with brackets made of plastic, but also with ceramic brackets, there using the CIM method (ceramic injection moulding), and also with metallic brackets, there using the MIM method (metal injection moulding). With the CIM method as well as with the MIM method, a powder slurry is injected into an injection mould, compressed and subsequently sintered. The shaping takes place partially using sliders in the injection mould. This is valid in particular for the forming process of the slot. In order to mould a passive bracket instead of an active bracket, it suffices to replace the slider required for the forming process of the slot by a somewhat longer slider. All other components of the mould can remain unchanged. Brackets according to the invention of both embodiments of the set can hence be produced quite efficiently and at low cost.

The largest cross sections, which can be found at the moment in practice for orthodontic archwires, have either dimensions of 0.022 inch×0.025 inch or dimensions of 0.018 inch×0.025 inch, wherein 0.025 inch is the height, which the archwire can have above the base area of the slot in the bracket. It is therefore preferable that the minimum clear width of the slot is either equal to 0.022, i.e. 0.56 mm or 0.018 inch i.e. 0.46 mm. The width of the slot can be larger in some places, for instance at both ends of the slot. In order however to be able to insert an archwire with a width of 0.022 inch or 0.018 inch, the slot should everywhere have at least this clear width of 0.022 inch or of 0.018 inch, respectively. But the clear width of the slot should not be substantially larger than 0.022 inch or 0.018 inch, respectively, everywhere in order to be able to transmit torques to the teeth also with an archwire having a rectangular or square cross section.

For a first bracket of the set, the size of the distance of the stop for the labial leg of the dip from the base area of the slot is preferably selected in such a way that an orthodontic archwire having the largest cross section occurring in orthodontic practice is not subjected to pressure by the clip in its closed position when the archwire lies on the base area of the slot. If an archwire with reduced height is inserted into the first bracket instead of an archwire having the largest cross section occurring in orthodontic practice, the lower archwire can obviously not be subjected to any pressure by the resilient clip, as long as the archwire lies on the base area of the slot. For a second bracket of the set, the size of the distance of the stop for the labial leg of the clip from the base area of the slot is preferably selected to be smaller than in the first bracket so that at least the archwire with the largest cross section occurring in orthodontic practice is always subjected to pressure by the labial leg of the clip so that the bracket behaves actively while the first bracket behaves passively in every case.

The distance of the stop for the labial leg of the clip from the base area of the slot amounts for a first bracket, which should be used as a passive bracket, advantageously to 0.025 inch i.e. 0.64 mm. The distance could also be selected to be larger but it is not advantageous because this would unnecessarily increase the height of the bracket. For a second bracket of the set, the size of the distance of the lingual stop for the labial leg of the clip from the base area of the slot is preferably 0.3 mm to 0.5 mm, in particular 0.8 to 0.42 mm. For orthodontiv practice this is quite a good compromise for the depth of the slot in an active bracket, measured from the lingual stop for the labial leg of the clip to the base area of the slot.

Brackets of the set according to the invention have at least one lingual stop for the labial leg of the clip, in order to limit the immersion depth of the labial leg of the clip into the slot of the bracket efficiently. The brackets of the set according to the invention preferably also have a stop efficient in labial direction for the labial leg of the clip, in order to prevent the archwire from bending up the labial leg of the clip during orthodontic treatment to the extent that the archwire may come off the slot. To make such a stop that is efficient in labial direction, the recess in the gingival wall or (with reverse orientation of the clip) in the occlusal wall of the bracket must be a window or a groove having rims running parallel to the base area of the slot.

The set preferably includes brackets which only differ in the depth of the slot. In particular, the set comprises pairs of brackets with identical clips, wherein both brackets of a pair only differ in the depth of the slot. Different brackets can be used for attachment to different teeth, for instance brackets with different accessories or with different angulation and for transmitting a different torque. There can be an active bracket and a passive bracket in each of these different embodiments.

BRIEF DESCRIPTION OF THE DRAWINGS

The accompanying drawings provide better explanation of the invention, which show an active bracket and a passive bracket. Identical or correlating parts in the brackets are designated with matching reference numbers.

Only the parts, in which the passive bracket differs from the active bracket, are designated by reference signs in the representations of the passive brackets.

DETAILED DESCRIPTION

Figure 1:
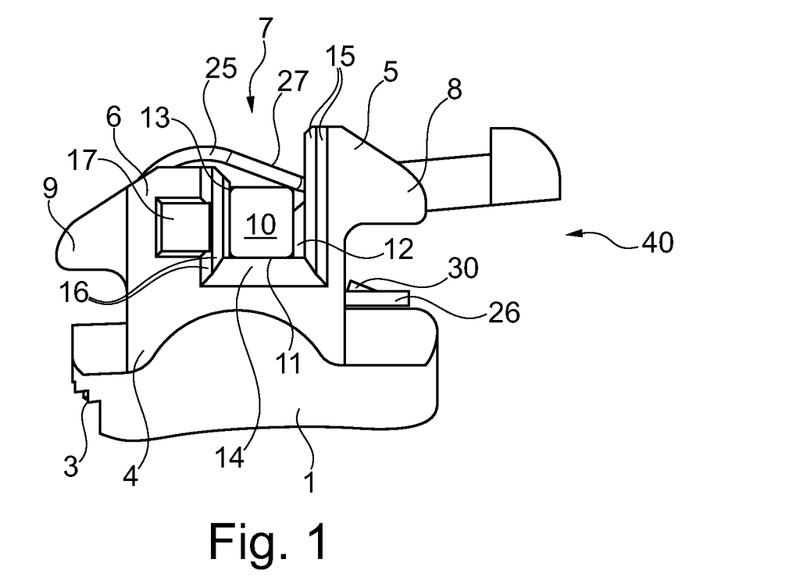
FIG. 1 shows an active bracket in a side view looking in the longitudinal direction of the slot in the bracket.
Figure 2:
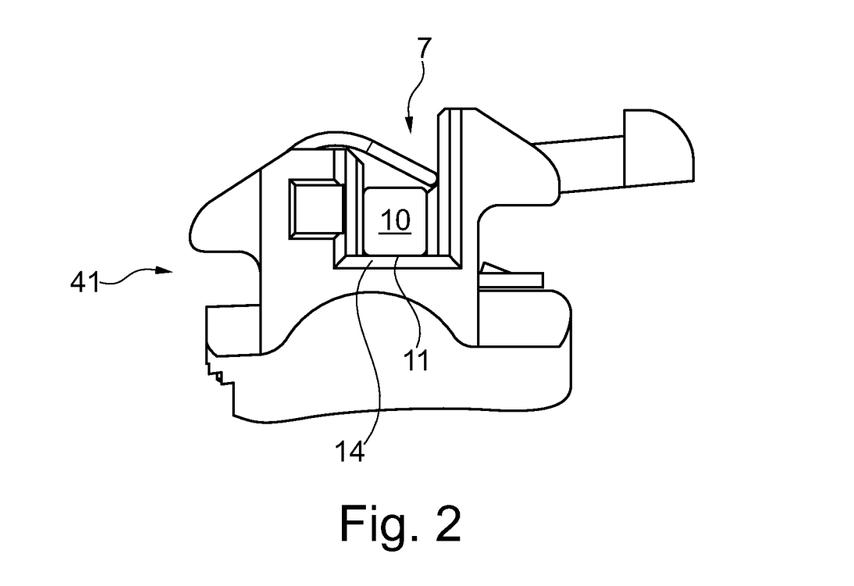
FIG. 2 shows a corresponding passive bracket in a side view according to FIG. 1.
Figures 3, 4, 5:
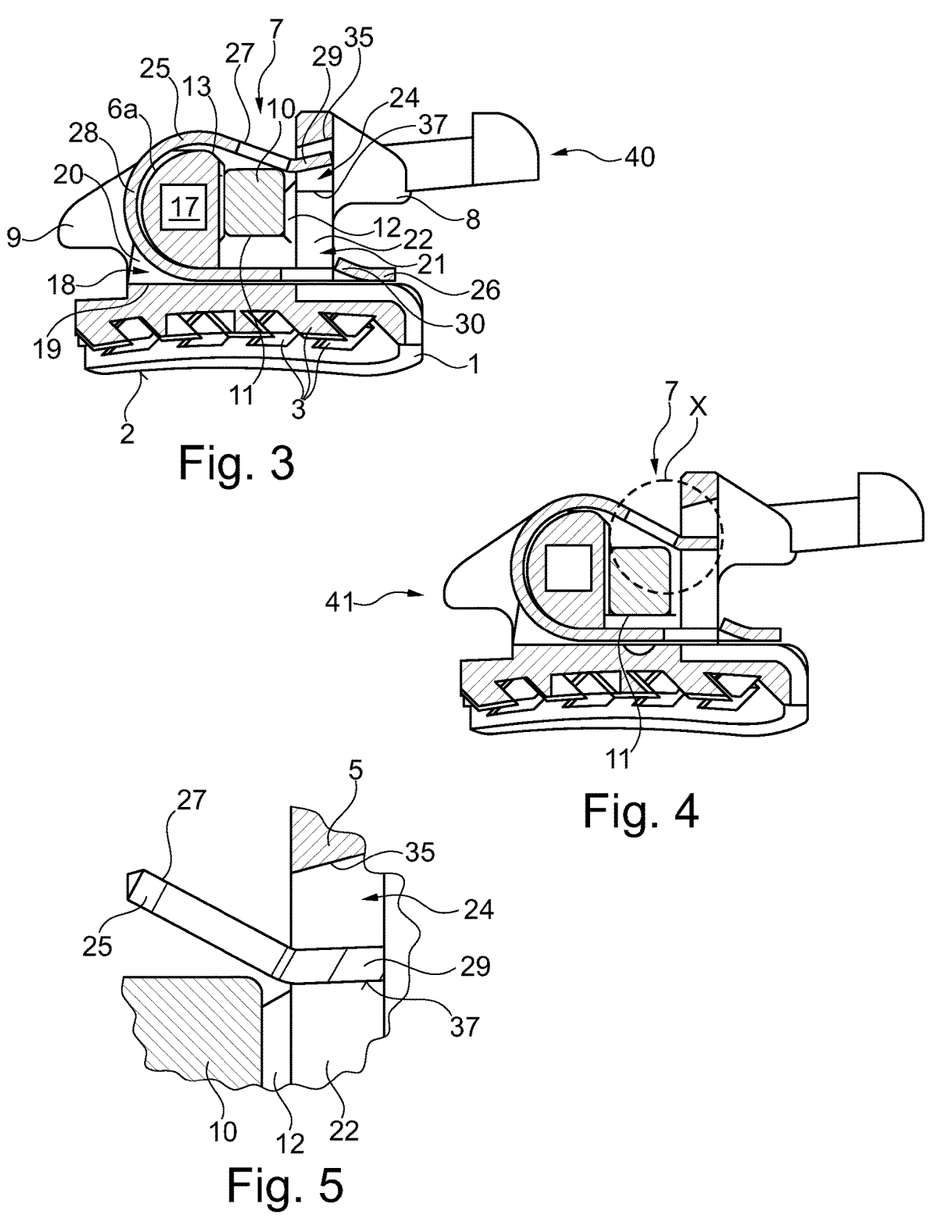
FIG. 3 shows the active bracket of FIG. 1 in a central cross section, positioned at right angle through the slot.
FIG. 4 shows the passive bracket of FIG. 2 in a section corresponding to FIG. 3.
FIG. 5 shows an enlarged detail "X" of FIG. 4.

Both brackets, the active bracket 40 and the passive bracket 41, have a cambered base 1, whose camber approximates the front side of a tooth. The base 1 has in its underside 2, which forms the lingual side of the bracket 40, 41, protrusions 3 arranged successively, which are undercut. The protrusions 3 are in a section as shown in FIGS. 3 and 4, rhombic and in a section parallel to the underside 2 rectangular. An adhesive can be coated on the underside 2, in order to glue the bracket 40, 41 to the front side of a tooth. The interlocking of the protrusions 3 with the adhesive enables to obtain good adherence. In each row, the protrusions 3 and the undercuts are oriented in a matching manner. From row to row, they are however oriented alternately sometimes in one direction and sometimes in the other direction. This enables to obtain the same adherence in case of a thrust acting on the bracket 40, 41 in gingival-to-occlusal direction as in case of a thrust in occlusal-to-gingival direction.

Figure 7:
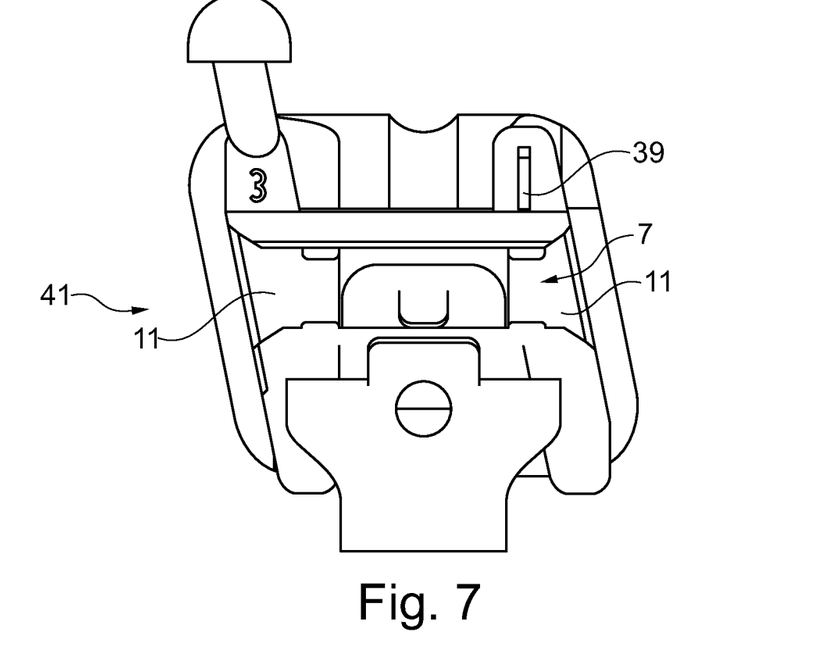
FIG. 7 shows the passive bracket of FIG. 2 in a representation corresponding to FIG. 6.
Figure 8:
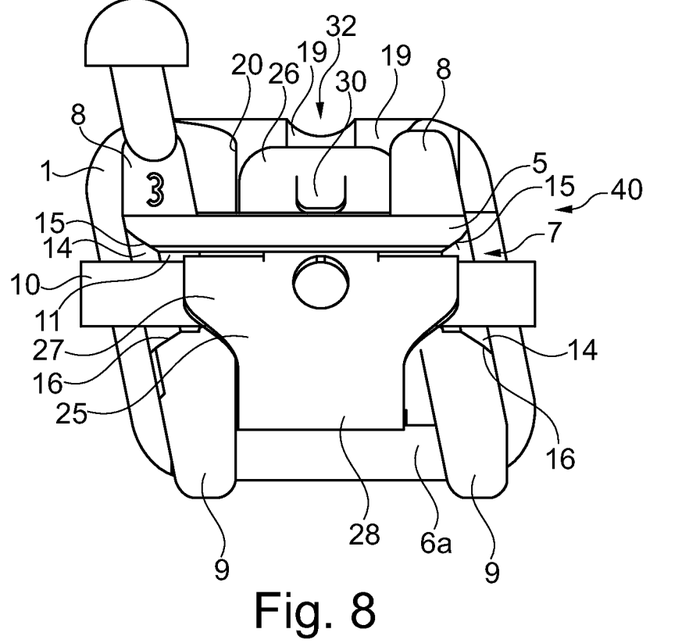
FIG. 8 shows the active bracket of FIG. 1 in an elevation view with its resilient clip in its closed position.
Figure 9:
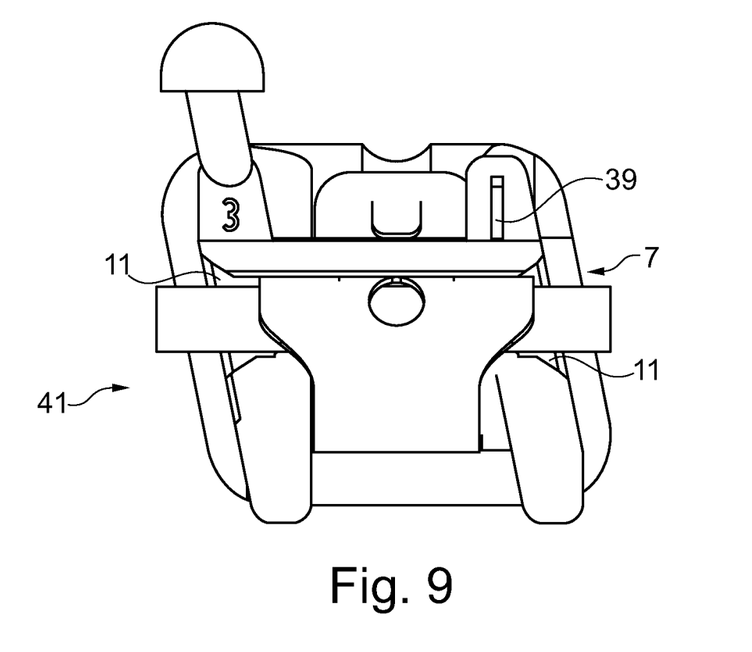
FIG. 9 shows the passive bracket of FIG. 2 in a representation corresponding to FIG. 8.

In FIG. 7, the orientation provided for the bracket on a tooth is specified in terms of gingival-occlusal and distal-mesial directions.

The base 1 turns into a block 4 on which a gingival wall 5 and an occlusal wall 6 stand. Both walls 5 and 6 run parallel relative to one another and are separated by a groove 7, which is also called slot and which runs continuously from distal to mesial and is open to labial.

Two ligature wings 8 protruding into the gingival direction are provided on the gingival wall 5. Two ligature wings 9 protruding into the occlusal direction are provided on the occlusal wall 6. Ligature wires can be fixed thereon in a way known to the skilled person.

The slot 7 serves for receiving an archwire 10, which has in particular a rectangular cross-section. Pressure can be exerted on the base area 11 of the slot and a torque can be exerted on the walls 5 and 6 of the bracket by pretensioning the archwire 10. For that purpose, the clear cross-section of the slot 7 is substantially rectangular. In the present case, it is slightly narrowed by flat, low ribs 12 on the gingival wall 5 and by flat, low ribs 13 on the occlusal wall 6. The ribs 12 and 13 are used for reducing the friction of the archwire 10 in the slot 7. The base area 11 of the slot 7 is, as described in more detail below, not formed over the whole length of the slot 7 on the same level, but rather interrupted. This also reduces the friction of the archwire 10 in the slot 7. At the ends of the slot 7 the base area of the slot 7 contains rounded sloping faces 14, the gingival wall 5 rounded sloping faces 15 and the occlusal wall 6 rounded sloping faces 16, which widen the entrance of the slot 7 and are also used for reducing the friction for the archwire 10 situated in the slot 7; which proves particularly advantageous in case of major malpositions of the teeth, which require the path of the archwire 10 to be particularly irregular.

A continuous channel 17 is provided from distal to mesial in the occlusal wall which can accommodate an auxiliary element for correcting the position of the teeth, for example a spring, a hook or an auxiliary wire.

A slit-like passage 18 extends beneath the base area 11 of the slot 7 and parallel thereto. This passage is limited on the lingual side by a flat surface 19, which is parallel to the base area 11 of the slot 7. This surface 19 extends starting from the occlusal wall 6 crosswise through the bracket 40, 41 and runs initially in the base 4 and finally in the gingival region of the bracket in the base 1 thereof. In the vicinity of the ligature wings 8 and 9, the passage 18 is delimited by sides 20 which run parallel to one another and at right angle to the lingual surface 19. The occlusal wall 6 has above the passage 18 a cylinder-casing-shaped surface 6a on its side facing away from the slot 7. This provides a funnel-shaped entrance to the passage 18 on the occlusal side of the bracket 40, 41. The bottom of the slot 7 is lowered down to below the base area 11 between the side walls 20, that is to say down to the lingual surface 19 of the passage 18.

Figure 10:
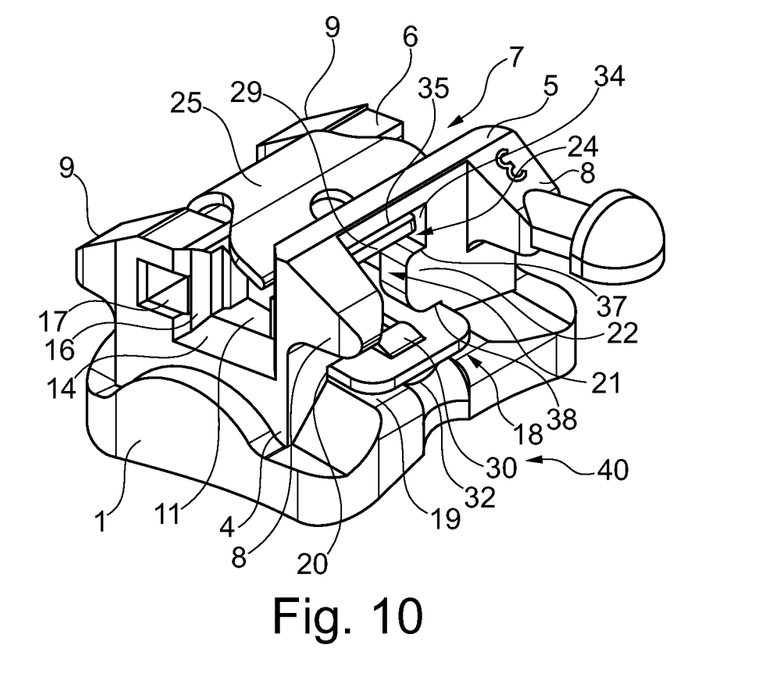
FIG. 10 shows the active bracket of FIG. 1 in an oblique view and, FIG. 11 shows the active bracket of FIG. 2 in an oblique view.
Figure 11:
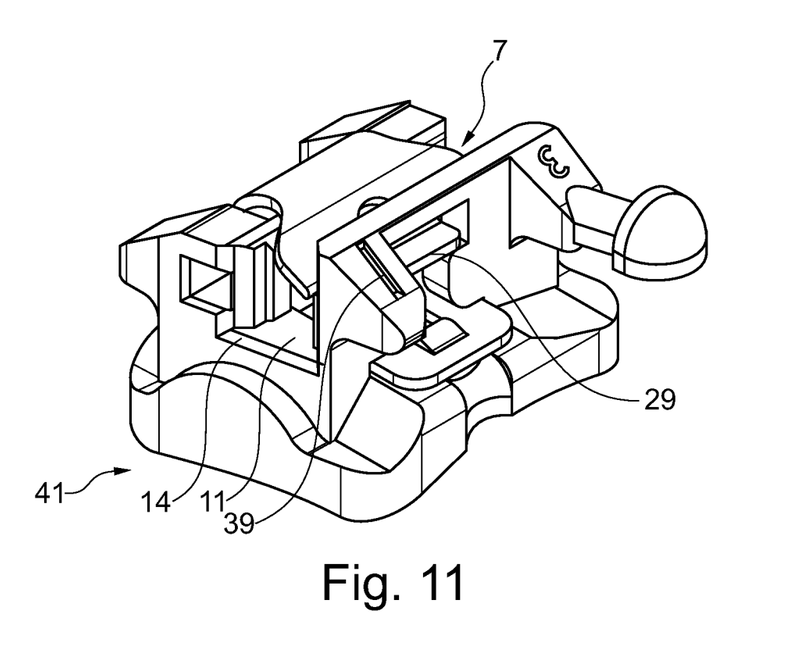

A recess 21 is provided in the gingival wall 5. This recess is surrounded by the lingual surface 19, by the side walls 20, by protrusions 22 that are directed towards one another, are adjoining the side walls 20 and between which the gingival wall 5 has a gap, see FIGS. 10 and 11, by two rims 34 parallel to the side walls 20 and by a labially located rim 35. The lingual rims 38 of the protrusions 22 are used for guiding the lingual leg 26 of the clip 25. The rims 34 and 35 as well as the protrusions 22 define as components of the cut-out 21 a substantially rectangular window 24, whose length in the distal-mesial direction is larger than the distance of the protrusions 22 from each other, but is smaller than the distance of the gingival ligature wings 8, also smaller than the distance of the ribs 12 and 13, which in the present case matches the distance of the side walls 20. The ribs 12 provided on the gingival wall 5 end in the height of the lingual rim of the window 24, which at the same time is the labial rim of the protrusions 22.

The brackets 40, 41 are supplemented by a clip 25 made of a resilient material into self-ligating brackets. The clip 25 has a rectilinearly running lingual leg 26 and a labial leg 27, shorter in contrast thereto, which extends approximately rectilinearly. Both legs 26 and 27 are connected via an occlusally located section 28 running approximately along an arc of a circle. Said section is exactly as wide as the lingual leg 26, which fits with little clearance into the passage 18. The labial leg 27 widens approximately to the length of the slot 7. It does not run parallel but rather at an acute angle to the lingual leg 26, which it approaches, from the occlusal section 28. The labial leg 27 has on its gingival end a gingivally extending extension 29, which is angled in the labial direction. The extension 29 is narrower than the labial leg 27 and narrower than the lingual leg 26; it fits (relative to the longitudinal direction of the slot 7) with little clearance into the window 24, which is an integral part of the recess 21 in the gingival wall 5.

A tongue 30 is cut out of the lingual leg 26 in the vicinity of the gingival end thereof and raised towards the occlusal section 28 under an acute angle leading to the lingual leg 26.

The clip 25 is connected to the bracket 40, 41 by inserting the lingual leg 26 into the passage 18 from the occlusal direction. Thereby, the tongue 30 is pushed progressively into the cut-out of the lingual leg 26 by the narrowing entrance to the passage 18, from which leg the tongue 30 is cut out. As soon as the tongue 30 has passed the occlusal wall 6, it springs back and is now directed towards the occlusal wall 6, so that the clip 25 cannot get lost any longer. As the clip 25 is pushed forward until it reaches said position, the extension 29 abuts against the cylinder-casing-shaped surface 6a of the occlusal wall 6 and slides thereon up to the labial upper side thereof. Thereby the clip 25 is spread against its elastic reset force. As the clip 25 is pushed forward further, the labial leg 27 of the clip 25 slides from the labial upper side of the occlusal wall 6 downwards and springs into the slot 7, where it can lean on an archwire 10 with a resilient force in an active bracket (FIGS. 1, 3, 6, 8, 10), if said archwire has such a height that it protrudes over the lingual rims 37 of the window 24, which form a lingual stop for the labial leg 27 of the clip 25. By recovering resiliently, the clip 25 is driven further as it pushes away from the occlusal wall 6, until it engages into the window 24 of the gingival wall 5 with its extension 29. Thus, the clip 25 secures the archwire 10 in the slot 7, because the archwire 10 can raise the labial leg 27 of the clip 25 at most so far until its extension 29 hits the labial rim 35 of the window 24. The lingual rims 37 of the window 24 are also the labial rims of the protrusions 22; they determine the smallest distance which the labial leg 27 of the clip 25 can have from the base area 11 of the slot 7.

With a passive bracket 41 (FIGS. 2, 4, 5, 7, 9, 11), the base area 11 is positioned deeper compared with the active bracket 40, i.e. it has a greater distance from the lingual stop 37 for the labial leg 27 of the clip 25 than with an active bracket 40. Archwires, which lie on the base area 11 in the slot 7, are not clamped by the clip 25, with a passive bracket 41. The correction of the position of the teeth can thus be accelerated. The passive bracket 41 carries a marking 39 for easier differentiation from the active bracket 41.

For reducing the friction between the archwire 10 and the clip 25 with an active bracket 40, the distal rim and the mesial rim of the labial leg 27 of the clip 25 are preferably rounded or provided with a sloping face.

To move the clip 25 from its closed position (FIGS. 1 to 5 and 8 to 11) into its open position (FIGS. 6 and 7), a tool may be used, for example a scaler, to be attached to the gingival rim of the lingual leg 26 of the clip 25. This location can be felt without being seen because the surface 19 delimiting the passage 18 on the lingual side thereof extends in gingival direction to the extent that it protrudes over the gingival end of the lingual leg 26 of the clip 25. The lingual surface 19 also contains, extending from its gingival end, a groove 32, running up to the lingual leg 26 of the clip 25. The groove 32 assists in the positioning of the tool with which the groove 32 can be felt. Once the groove 32 has been found, the clip 25 is pushed with the tip of the tool in gingival-to-occlusal direction. In so doing, the tip of the tool is guided further through the groove 32 in the right direction. With the clip 25 in the open position, the labial leg 27 of the clip 25 has a rest position on the occlusal wall 6, in which it releases the entrance to the slot 7 from a labial direction.

Figure 6:
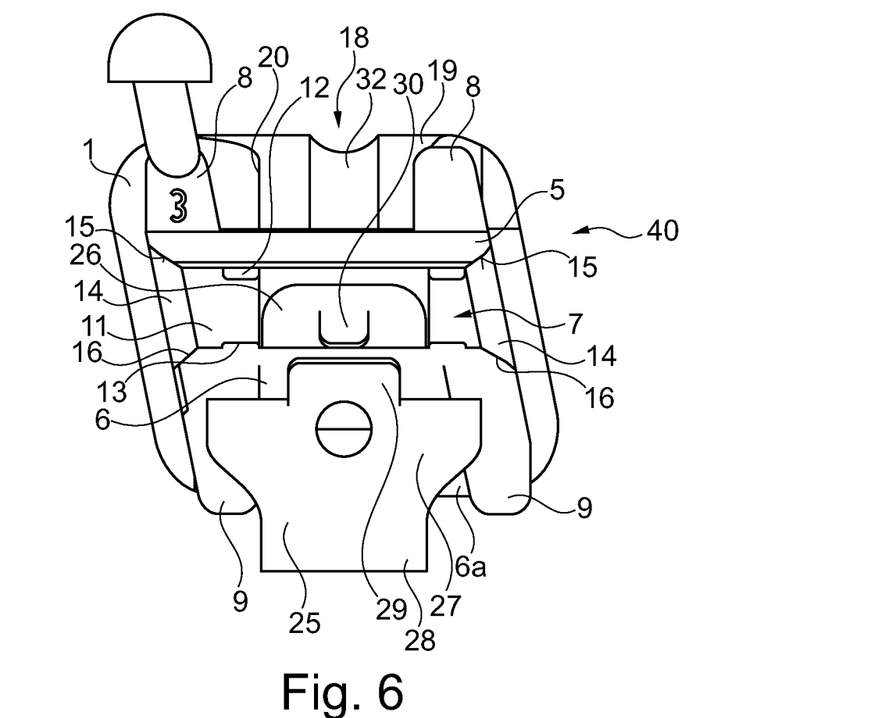
FIG. 6 shows the active bracket of FIG. 1 with its resilient clip in open position in elevation view.

The clip 25 can be pushed in the occlusal direction only so far until the tongue 30 hits the occlusal wall 6. It is hence impossible to lose clip 25 as it is moved from its closed position (FIGS. 1 to 5 and 8 to 11) into its open position (FIGS. 6 and 7). To separate the clip 25 from the bracket 40, 41 completely, the tongue 30 has to be pushed back with a tool into the cutout in the lingual leg 26 of the clip 25, from which it is cut out, and while the tongue 30 is kept pressed down, the clip 25 has to be pushed or retracted further in the occlusal direction.

A comparison of the representations of the active brackets 40 in FIGS. 1, 3, 6, 8 and 10 with the representations of the passive brackets 41 in FIGS. 2, 4, 5, 7, 9 and 11 clearly shows that the significant difference between both brackets consists in the fact that the distance between the lingual stop 37 and the base area 11 with a passive bracket 41 is larger than with an active bracket 40, namely so large that even the archwire 10 having the largest cross section occurring in orthodontic practice from the clip 25 is not subjected to pressure (see FIG. 5), when the archwire 110 lies on the base area 11 of the slot 7.

The enlargement of the distance between the lingual stop 37 and the base area 11 with a passive bracket 41 goes along with a lengthening of the sloping faces 15 and 16 as well as with a reduction of the sloping faces 14 at the ends of the slot 7. Except for the marking 39, the passive bracket 41 has no further modifications with respect to the active bracket 41.

Reference Numbers
1. Base
2. Lower side of 1
3. Protrusions
4. Block
5. Gingival wall
6. Occlusal wall
6a. Cylinder-casing-shaped surface
7. Slot
8. Gingival ligature wings
9. Occlusal ligature wings
10. Archwires
11. Base area of 7
12. Ribs on 5
13. Ribs on 6
14. Sloping faces on 11
15. Sloping faces on 5
16. Sloping faces on 6
17. Channel
18. Passage
19. Lingual surface
20. Side walls
21. Recess in 5
22. Protrusions in 5
23. —
24. Window
25. Clip
26. Lingual leg
27. Labial leg
28. Occlusal section of 25
29. Extension of 27
30. Tongue
31. —
32. Groove
33. —
34. Rims of 24
35. Labially situated rim of 24, Labial stop
36. —
37. Lingual rims of 24, lingual stop
38. Lingual rims of 22
39. Marking on 40
40. Active bracket
41. Passive bracket

The invention claimed is:

1. A set of self-ligating brackets for orthodontics, each of the brackets comprising:
a base;
a block arranged on the base;
an occlusal wall extending from the block and having at least one occlusal ligature wing;
a gingival wall extending from the block and having at least one gingival ligature wing;
a slot separating the occlusal wall and the gingival wall from one another, said slot having a minimum clear width which is the same for each of the brackets of the set and extends continuously in a direction from mesial to distal, and having a base area on which a given orthodontic archwire lies during orthodontic treatment, the given orthodontic archwire having a rectangular or square cross section defined by a given width and a given height;
a passage extending in a gingival-occlusal direction through the block and being delimited by a lingually located surface and by a labially located surface;
a resilient clip for each of the brackets with a labial leg and with a lingual leg interconnected by an occlusally arranged portion;
wherein the lingual leg can be inserted into the passage and can be displaced therein only in the gingival-occlusal direction between a closed position in which a tip of the labial leg extends into a recess in the gingival wall, said recess providing at least in a lingual direction a lingual stop for the extension of the labial leg from which lingual stop the labial leg of the clip can be raised by the given orthodontic archwire inserted into the slot, and an open position of the clip in which the tip of the labial leg is situated above the occlusal wall, wherein the tip has a smaller width in the mesial to distal direction in comparison to a width of the labial leg in the mesial to distal direction;
including a labial stop in the gingival wall wherein the labial stop provides at least in a labial direction the labial stop for the labial leg of the resilient clip, wherein the recess is further delimited by at least one rim formed in the gingival wall, the at least one rim connecting the labial stop to the lingual stop, wherein a width of the recess as measured from the at least one rim in the mesial to distal direction is less than a distance of the ends of the gingival wall in the mesial to distal direction and is greater than the width of the tip in the mesial to distal direction such that the tip can be disposed within the recess;
the set comprising at least one bracket which, in combination with the given arch wire, is a passive bracket and at least one other bracket which, in combination with the given arch wire, is an active bracket, where the passive and active brackets differ only in the depth of the slot and thus differ in terms of the distance of their lingual stop from the base area of the slot, said distance of the lingual stop from the base area of the slot being larger for the passive bracket than for the active bracket.

2. The set according to claim 1 wherein the resilient clips of all brackets of the set are identical.

3. The set according to claim 1 wherein the minimum clear width of the slot is equal to 0.56 mm (0.022 inch) for receiving the given orthodontic archwire having a maximum cross section of 0.56 mm×0.64 mm (0.022 inch×0.025 inch), or is equal to 0.46 mm (0.018 inch) for receiving the given orthodontic archwire having a maximum cross section of 0.46 mm×0.64 mm (0.018 inch×0.025 inch).

4. The set according to claim 1 wherein the brackets which differ only in the depth of the slot include a first bracket in which the size of the distance of the stop for the labial leg of the clip from the base area of the slot is selected so large that the given orthodontic archwire having a cross section of at most 0.56 mm×0.64 mm (0.022 inch×0.025 inch) is not subjected to pressure by the clip in its closed position when the given orthodontic archwire lies on the base area of the slot, and that the brackets which differ only in the depth of the slot include a second bracket in which the size of the distance of the stop for the labial leg of the clip from the base area of the slot is selected to be smaller than for the first bracket.

5. The set according to claim 1 further comprising said given orthodontic archwire.

6. The set according to claim 5, wherein the given orthodontic archwire contained therein has a cross section of maximum 0.56 mm×0.64 mm (0.022 inch×0.025 inch).

7. The set according to claim 1, wherein for the brackets which differ only in the depth of the slot the distance of the lingual stop for the labial leg of the clip from the base area of the slot is equal to 0.64 mm (0.025 inch) for a passive bracket and 0.3 mm to 0.5 mm for an active bracket.

8. The set according to claim 1, wherein for the brackets which differ only in the depth of the slot the distance of the stop for the labial leg of the clip from the base area of the slot is equal to 0.64 mm (0.025 inch) for a first bracket and 0.38 mm to 0.42 mm for a second bracket.

9. The set according to claim 1, wherein the recess in the occlusal wall of all of the brackets is or includes a window or a groove having rims running parallel to the base area of the slot.

10. The set according to claim 1, wherein for the at least one passive bracket the distance of the lingual stop to the base area of the slot is at least 0.64 mm, wherein for the at least one active bracket the distance of the lingual stop to the base area of the slot is 0.3 to 0.5 mm, and wherein the given orthodontic archwire is disposed in the slots for both the at least one passive bracket and the at least one active bracket, wherein a height of the given orthodontic archwire is at most 0.64 mm.

11. A set of self-ligating brackets for orthodontics, each of the brackets comprising:
 a base;
 a block arranged on the base;
 an occlusal wall extending from the block and having at least one occlusal ligature wing;
 a gingival wall extending from the block and having at least one gingival ligature wing;
 a slot separating the occlusal wall and the gingival wall from one another, said slot having a minimum clear width which is the same for each of the brackets of the set and extends continuously in a direction from mesial to distal and has a base area on which a given archwire lies during orthodontic treatment, the given archwire having a rectangular or square cross section defined by a given width and a given height;
 a passage extending in a gingival-occlusal direction through the block and being delimited by a lingually located surface and by a labially located surface;
 a resilient clip for each of the brackets with a labial leg and with a lingual leg interconnected by a gingivally arranged portion, wherein the lingual leg can be inserted into the passage and can be displaced therein only in the gingival-occlusal direction between a closed position in which a tip of the labial leg extends into a recess in the occlusal wall, said recess providing at least in lingual direction a lingual stop for the tip of the labial leg from which lingual stop the labial leg of the clip can be raised by the given archwire inserted into the slot, and an open position of the clip in which the tip of the labial leg is situated above the gingival wall, wherein the tip has a smaller width in the mesial to distal direction in comparison to a width of the labial leg in the mesial to distal direction;
 including a labial stop in the occlusal wall wherein the labial stop provides at least in a labial direction the labial stop for the labial leg of the resilient clip, wherein the recess is further delimited by at least one rim formed in the occlusal wall, the at least one rim connecting the labial stop to the lingual stop, wherein a width of the recess as measured from the at least one rim in the mesial to distal direction is less than a distance of the ends of the occlusal wall in the mesial to distal direction and is greater than the width of the tip in the mesial to distal direction such that the tip can be disposed within the recess; and
 wherein the set comprises active and passive brackets which differ only in the depth of the slot and thus differ in terms of the distance of their lingual stop from the base area of the slot, the active brackets having a first depth of the slot such that the given archwire inserted in the slot is always subjected to pressure by the clip and the passive brackets having a second depth of the slot being larger than the first depth, where said given archwire inserted into the second slot and lying on the base thereof is not subjected to pressure by the clip.

12. The set according to claim 11, wherein the resilient clips of all brackets of the set are identical.

13. The set according to claim 11, wherein for the at least one passive bracket the distance of the lingual stop to the base area of the slot is at least 0.64 mm, wherein for the at least one active bracket the distance of the lingual stop to the base area of the slot is 0.3 to 0.5 mm, and wherein the given archwire is disposed in the slots for both the at least one passive bracket and the at least one active bracket, wherein a height of the given archwire is at most 0.64 mm.

14. A set of self-ligating brackets for orthodontics, each of the brackets comprising:
 a base;
 a block arranged on the base;
 an occlusal wall extending from the block and having at least one occlusal ligature wing;
 a gingival wall extending from the block and having at least one gingival ligature wing;
 a slot, which separates the occlusal wall and the gingival wall from one another, has a minimum clear width which is the same for each of the brackets of the set and wherein the slot extends continuously in a direction from mesial to distal and has a base area on which a given orthodontic archwire lies during orthodontic treatment, the given orthodontic archwire having a rectangular or square cross section defined by a given width and a given height;
 a passage, which extends in a gingival-occlusal direction through the block and is delimited by a lingually located surface and by a labially located surface;
 a resilient clip for each of the brackets with a labial leg and with a lingual leg, which are interconnected by an occlusally arranged portion;

wherein the lingual leg can be inserted into the passage and can be displaced therein only in the gingival-occlusal direction between a closed position, in which the labial leg extends into a recess in the gingival wall said recess providing at least in lingual direction a lingual stop for the labial leg, and an open position of the clip in which a tip of the labial leg is situated above the occlusal wall;

including a labial stop in the gingival wall wherein the labial stop provides at least in a labial direction the labial stop for the labial leg of the resilient clip, wherein the recess is further delimited by at least one rim formed in the gingival wall, the at least one rim connecting the labial stop to the lingual stop, wherein a width of the recess as measured from the at least one rim in the mesial to distal direction is less than a distance of the ends of the gingival wall in the mesial to distal direction and is greater than the width of the tip in the mesial to distal direction such that the tip can be disposed within the recess; and wherein the set of brackets comprises brackets which differ only in the depth of the slot and thus differ in terms of the distance of their lingual stop from the base area of the slot;

wherein the brackets which differ only in the depth of the slot include a first bracket in which the size of the distance of the stop for the labial leg of the clip from the base area of the slot is selected so large that said given orthodontic archwire having a cross section of at most 0.56 mm×0.64 mm (0.022 inch×0.025 inch), is not subjected to pressure by the clip in its closed position when said given orthodontic archwire lies on the base area of the slot, and that the brackets which differ only in depth of the slot include a second bracket in which the size of the distance of the stop for the labial leg of the clip from the base area of the slot is selected to be smaller than for the first bracket where said orthodontic archwire lying on the base area of the smaller slot is always subjected to pressure by the clip in its closed position.

15. A set of self-ligating brackets for orthodontics, each of the brackets comprising:
a base;
a block arranged on the base;
an occlusal wall extending from the block and having at least one occlusal ligature wing;
a gingival wall extending from the block and having at least one gingival ligature wing;
a slot, which separates the occlusal wall and the gingival wall from one another, has a minimum clear width which is the same for each of the brackets of the set and extends continuously in a direction from mesial to distal and has a base area on which a given archwire lies during orthodontic treatment, the given archwire having a rectangular or square cross section defined by a given width and a given height;
a passage, which extends in a gingival-occlusal direction through the block and is delimited by a lingually located surface and by a labially located surface;
a resilient clip for each of the brackets with a labial leg and with a lingual leg, which are interconnected by an occlusally arranged portion, wherein the lingual leg can be inserted into the passage and can be displaced therein only in the gingival-occlusal direction between a closed position, in which the labial leg extends into a recess in the gingival wall said recess providing at least in lingual direction a lingual stop for the labial leg from which lingual stop the labial leg of the clip can be raised by said given archwire inserted into the slot, and an open position of the clip in which a tip of the labial leg is situated above the occlusal wall;

wherein the brackets of the set differ only in the depth of the slot and thus differ in terms of the distance of their lingual stop from the base area of the slot, where the brackets having a first depth of the slot are configured to have said given archwire inserted in the slot always in contact with the clip, and where brackets having a second depth of the slot being larger than the first depth of the slot are configured to have the same given archwire inserted in the slot and lying on the base thereof not in contact with the clip;

wherein for the at least one passive bracket the distance of the lingual stop to the base area of the slot is at least 0.64 mm;

wherein for the at least one active bracket the distance of the lingual stop to the base area of the slot is 0.3 to 0.5 mm; and wherein the given archwire is disposed in the slots for both the at least one passive bracket and the at least one active bracket, wherein a height of the given archwire is at most 0.64 mm.

16. A set of self-ligating brackets for orthodontics, the brackets comprising:
a base;
a block arranged on the base;
an occlusal wall extending from the block and having at least one occlusal ligature wing;
a gingival wall extending from the block and having at least one gingival ligature wing;
a slot, which separates the occlusal wall and the gingival wall from one another and has a minimum clear width which is the same for each of the brackets of the set and wherein the slot extends continuously in a direction from mesial to distal and has a base area on which a given archwire lies during orthodontic treatment, the given orthodontic archwire having a rectangular or square cross section defined by a given width and a given height;
a passage, which extends in a gingival-occlusal direction through the block and is delimited by a lingually located surface and by a labially located surface;
a resilient clip for each of the brackets with a labial leg and with a lingual leg, which are interconnected by a gingivally arranged portion, wherein the lingual leg can be inserted into the passage and can be displaced therein only in the gingival-occlusal direction between a closed position, in which a tip of the labial leg extends into a recess in the occlusal wall said recess providing at least in lingual direction a lingual stop for the labial leg from which stop the labial leg of the clip can be raised by the given archwire inserted into the slot, and an open position of the clip in which a tip of the labial leg is situated above the occlusal wall, wherein the tip has a smaller width in the mesial to distal direction in comparison to a width of the labial leg in the mesial to distal direction;

including a labial stop in the gingival wall wherein the labial stop provides at least in a labial direction the labial stop for the labial leg of the resilient clip, wherein the recess is further delimited by at least one rim formed in the occlusal wall, the at least one rim connecting the labial stop to the lingual stop, wherein a width of the recess as measured from the at least one rim in the mesial to distal direction is less than a distance of the ends of the occlusal wall in the mesial to distal direction and is greater than the width of the tip in the mesial to distal direction such that the tip can be disposed within the recess; and wherein the brackets of the set comprise active and passive brackets which only differ in the depth of the slot and thus differ in terms of the distance of their lingual stop from the base area of the slot, where the active brackets having a first depth of the slot are configured to always subject the given archwire to a pressure by the clip and where the passive brackets having a second depth of the slot being larger than the first depth are configured to not subject the given archwire when lying on the base of the second depth of the slot to a pressure by the clip.

17. An orthodontic set configured to perform an orthodontic treatment on a single patient, the orthodontic set comprising:

a plurality of active brackets;

a plurality of passive brackets;

a plurality of orthodontic archwires, each orthodontic archwire of the plurality of orthodontic archwires configured to be used with any of the plurality of active and passive brackets, each orthodontic archwire of the plurality of orthodontic archwires being identical to one another by having a cross-section with an identical width and an identical depth; and a plurality of resilient clips configured to be used with the plurality of active and passive brackets, each resilient clip of the plurality of resilient clips being identical to one another, and each resilient clip having a labial leg and a lingual leg interconnected by an occlusally arranged portion;

wherein each bracket of the plurality of active and passive brackets comprises:
 a base;
 a block arranged on the base;
 an occlusal wall extending from the block and having at least one occlusal ligature wing;
 a gingival wall extending from the block and having at least one gingival ligature wing;
 a slot separating the occlusal wall and the gingival wall from one another, said slot having a minimum clear width which is the same for each of the brackets of the set and extends continuously in a direction from mesial to distal, and having a base area on which the orthodontic archwire lies during orthodontic treatment;
 a passage extending in a gingival-occlusal direction through the block and being delimited by a lingually located surface and by a labially located surface;

wherein the lingual leg can be inserted into the passage and can be displaced therein only in the gingival-occlusal direction between a closed position in which a tip of the labial leg extends into a recess in the gingival wall, said recess providing at least in a lingual direction a lingual stop for the extension of the labial leg from which lingual stop the labial leg of the clip can be raised by the orthodontic archwire inserted into the slot, and an open position of the clip in which the tip of the labial leg is situated above the occlusal wall, wherein the tip has a smaller width in the mesial to distal direction in comparison to a width of the labial leg in the mesial to distal direction;

including a labial stop in the gingival wall wherein the labial stop provides at least in a labial direction the labial stop for the labial leg of the resilient clip, wherein the recess is further delimited by at least one rim formed in the gingival wall, the at least one rim connecting the labial stop to the lingual stop, wherein a width of the recess as measured from the at least one rim in the mesial to distal direction is less than a distance of the ends of the gingival wall in the mesial to distal direction and is greater than the width of the tip in the mesial to distal direction such that the tip can be disposed within the recess;

wherein the plurality of passive and active brackets differ only in the depth of the slot and thus differ in terms of the distance of their lingual stop from the base area of the slot.

* * * * *